(12) United States Patent
Arisaka (10) Patent No.: US 7,018,152 B2
(45) Date of Patent: Mar. 28, 2006

(54) CLIP

(75) Inventor: Oomi Arisaka, Kanagawa (JP)

(73) Assignee: Piolax Inc., Yokohama (JP)

( * ) Notice: Subject to any disclaimer, the term of this patent is extended or adjusted under 35 U.S.C. 154(b) by 0 days.

(21) Appl. No.: 10/310,973

(22) Filed: Dec. 6, 2002

(65) Prior Publication Data

US 2003/0129040 A1 Jul. 10, 2003

(30) Foreign Application Priority Data

Dec. 7, 2001 (JP) .............................. P2001-374450

(51) Int. Cl.
*F16B 13/04* (2006.01)

(52) U.S. Cl. .................... 411/41; 411/344; 411/908; 411/40; 24/452

(58) Field of Classification Search ............... 411/41, 411/39, 40, 45, 46, 48, 340, 344, 908, 47; 24/452

See application file for complete search history.

(56) References Cited

U.S. PATENT DOCUMENTS

| 2,941,439 | A | * | 6/1960 | Rapata ......................... 411/41 |
| 3,417,438 | A | * | 12/1968 | Schuplin ...................... 411/41 |
| 3,918,130 | A | * | 11/1975 | Poe ............................ 24/453 |
| 4,122,583 | A | * | 10/1978 | Grittner et al. ............ 24/703.1 |
| 4,276,806 | A | * | 7/1981 | Morel .......................... 411/41 |
| 4,312,614 | A | * | 1/1982 | Palmer et al. ................ 411/44 |
| 4,832,547 | A | * | 5/1989 | Shiraishi ..................... 411/42 |
| 5,028,187 | A | * | 7/1991 | Sato ............................ 411/48 |
| 5,165,833 | A | * | 11/1992 | Watanabe et al. .......... 411/508 |
| 5,695,296 | A | * | 12/1997 | Miura .......................... 403/2 |
| 5,704,746 | A | * | 1/1998 | Leib et al. .................... 411/24 |
| 6,511,273 | B1 | * | 1/2003 | Arisaka ....................... 411/48 |
| 6,533,515 | B1 | * | 3/2003 | Meyer ......................... 411/45 |

FOREIGN PATENT DOCUMENTS

| JP | 54-44360 | | 3/1979 |
| JP | 1-108415 | | 7/1989 |
| JP | 8-270628 | | 10/1996 |
| JP | 0735285 | A1 * | 10/1996 |
| JP | 2002106519 | A * | 4/2002 |

* cited by examiner

*Primary Examiner*—Katherine Mitchell
(74) *Attorney, Agent, or Firm*—McGinn IP Law Group, PLLC (57) ABSTRACT

A clip includes a grommet, a pin, and a thin connection portion integrally connecting the grommet and the pin. The grommet includes a pair of expandable leg pieces and has a V-shape. The pin can relatively move inside the grommet. A through hole for guiding a top portion of the pin is defined at a tip of the V-shape of the grommet. The thin connection portion is located between an edge of the top portion of the pin and an edge of the through hole. The thin connection is cut when the pin is pushed into the inside of the grommet.

18 Claims, 9 Drawing Sheets

CLIP

The present disclosure relates to the subject matter contained in Japanese Patent Application No. 2001-374450 filed on Dec. 7, 2001, which is incorporated herein by reference in its entirety.

BACKGROUND OF THE INVENTION

1. Field of the Invention

The invention relates to a clip for fixing a trim board to a body panel of a vehicle and particularly to improvement of a clip in which a grommet and a pin are integrally connected by a thin connection portion.

2. Description of the Related Art

JP-A-Hei.8-270628 discloses a clip of this kind.

The clip according to the related art, which is not shown specifically, is an integrally molded piece made of a synthetic resin. The clip includes a grommet having a V-shape, a pin, which relatively moves inside the grommet, and a pair of thin connection portions, which connects the grommet and the pin. The grommet has a pair of leg pieces and a through hole. The pair of leg pieces correspond to both side walls forming the V-shape and can expand. The through hole for guiding a top portion of the pin is formed at a tip of the V-shape. The pin has a flange portion holding a trim board and a support portion downwardly extending from a lower surface of the flange portion. The thin connection portions integrally connect an inside surface of each of the leg pieces of the grommet and an outer surface of the support portion of the pin so that the movement of the pin inside the grommet can forcibly deform the connection portion.

It is assumed that a trim board is fixed to a body panel by using the clip according to the related art. The flange portion of the pin is made to hold the trim board in advance. While keeping this state, each of the leg pieces of the grommet is inserted into an attachment hole formed in the body panel and then the pin is forcibly pushed into the inside of the grommet. Simultaneously with pushing the pin into the inside of the grommet, the pair of thin connection portions are deformed to expand each of the leg pieces of the grommet outwardly. Thus, the trim board is fixed to the body panel side.

Accordingly, differently from a so called "two-piece clip", in the clip according to the related art, the grommet and the pin are integrally molded through the thin connection portion. Therefore, especially, the clip can be used conveniently. This is an advantage of the clip. However, the leg piece of the grommet and the support portion of the pin are always integrally connected through the thin connection portion. Therefore, when the leg piece is inserted into the attachment hole of the body panel, sufficient flexure with respect to the inside of the leg piece cannot be obtained. Also, when the pin is pushed into the inside of the grommet, since the push is performed with the pair of thin connection portions being deformed, considerable push-force is required. These are problems.

SUMMARY OF THE INVENTION

The invention has been developed to solve effectively the above mentioned problems concerning the clip according to the related art. According to a first aspect of the invention, there is provided a clip including a grommet having a pair of expandable leg pieces, the grommet having a V-shape, a pin, which can relatively move inside the grommet, and a thin connection portion integrally connecting the grommet and the pin. A through hole for guiding a top portion of the pin is defined at a tip of the V-shape of the grommet. The thin connection portion is located between an edge of the top portion of the pin and an edge of the through hole. The thin connection portion is cut when the pin is push into the inside of the grommet.

According to a second aspect of the invention, the thin connection portion is disposed at an open side where the leg pieces of the grommet do not exist.

According to a third aspect of the invention, a semicircle flange is formed on a free end side of each of the leg pieces of the grommet. A circular flange, which corresponds to each of semicircle flanges, is formed on a base end portion side of the pin. A spacer protrusion is formed on a rear surface of the circular flange to fill a gap between the semicircle flanges.

According to a fourth aspect of the invention, the through hole for guiding the top portion of the pin is formed in a square shape. The top portion of the pin is formed in a square shape similar to the through hole.

According to a fifth aspect of the invention, a convex portion is formed above the thin connection portion. An engagement hole for engaging with the convex portion is formed in a side surface of a top portion of the V-shape of the grommet. When the thin connection portion is cut by pushing the pin into the inside of the grommet, the convex portion engages with the engagement hole.

Accordingly, in the first aspect, the invention is different from a related art in that an intermediate portion of the leg pieces of the grommet is not restrained by the thin connection portions but is in a free state. Therefore, when the clip is inserted into the attachment hole of the panel, the clip can sufficiently bend inward so that a small pushing force is required. Also, after the thin connection portions are cut by pushing the pin into the inside of the grommet, similarly a small pushing force is required and a user feels clear resistance when the connection portions are cut.

In the second aspect, if the pin tries to fall down to the open side of the V-shape, the pair of thin connection portions are not easily cut since the thin connection portions are disposed in the falling direction. Therefore, even when accidental external force is added during handling or delivering the clip, it is prevented from separating the pin and the grommet undesirably. In the third aspect, since the spacer protrusion fills the gap between the pair of semicircle flanges, the end portion of the screwdriver cannot be inserted from this position. Therefore, in case of the disconnection of the clip itself, there is no fear that the screwdriver or the like scratches a surface of the trim board P2.

In the fourth aspect, the through hole and the top portion of the pin have the square shape so that rotation of the pin with respect to the grommet is restricted. Therefore, the spacer protrusion is accurately fitted into the gap between the semicircle flanges. In the fifth aspect, a structure of a mold is simplified and engaging the convex portion with the engagement hole keeps the pin in a state immediately before use.

DETAILED DESCRIPTION OF THE PREFERRED EMBODIMENTS

Hereinafter, preferred embodiments of the invention will be described with reference to the accompanied drawings. As shown in FIGS. 1 to 5, the clip according to the embodiment includes a grommet 1, a pin 3, and a pair of thin connection portions 4. The grommet 1 having a V-shape is an integrally molded piece made of a synthetic resin and includes a pair of leg pieces 2, which are expandable. The pin 3 relatively moves inside the grommet 1. The connection portions 4 connect the grommet 1 and the pin 3 integrally. A through hole 5 for guiding a top portion 3a of the pin 3 is formed at a tip of the V-shape of the grommet 1.

At first, with regard to the grommet 1, semicircle flanges 6 having a predetermined gap 7 therebetween are formed at a free end side of the pair of leg pieces 2 defining the V-shape. A thick portion 8 is formed inside each of the leg pieces 2. The through hole 5 having a square shape for guiding the top portion of the pin 3 is formed at the tip of the V-shape. A pair of engagement holes 9, which engage with convex portions 13 (described later) formed at the top portion 3a of the pin 3, are formed in both side surfaces on an open side where the leg pieces 2 do not exit.

With regard to the pin 3, a circular flange 10, which corresponds to each of semicircle flanges 6, is formed at a base end portion side of the pin 3. A spacer protrusion 11 for filling the gap 7 between the semicircle flanges 6 is formed on a rear surface of the circular flange 10. A support portion 12 having a cross shape on cross section extends downwardly from a center portion thereof. The support portion 12 continuously extends to the top portion 3a having a square shape and a small diameter. The pair of convex portions 13 for engaging with the engagement holes 9 are formed at both side surfaces of the top portion 3a.

The thin connection portions 4 are disposed to connect an edge of the top portion 3a of the pin 3 and an edge of the through hole 5 of the grommet 1. In this case, the connection portions 4 are formed on a side where the convex portions 13 are formed, that is, the open side where the leg pieces 2 do not exist. If the pin 3 tries to fall down to the open side of the V-shape, the pair of thin connection portions are not easily cut since the thin connection portions 4 are disposed in the falling direction. Therefore, even when accidental external force is added during handling or delivering the clip, it is prevented from separating the pin 3 and the grommet 1 undesirably. However, when the pin 3 is straight pushed into the inside of the grommet in a through hole 5 direction, the pair of thin connection portions 4, are easily cut to allow the top portion 3a of the pin 3 to come into the through hole 5. Incidentally, with regard to a positional relation between the thin connection portions 4 and the convex portions 13, as shown in the drawings, each of convex portions 13 is located above each of the thin connection portions 4.

Figure 1:
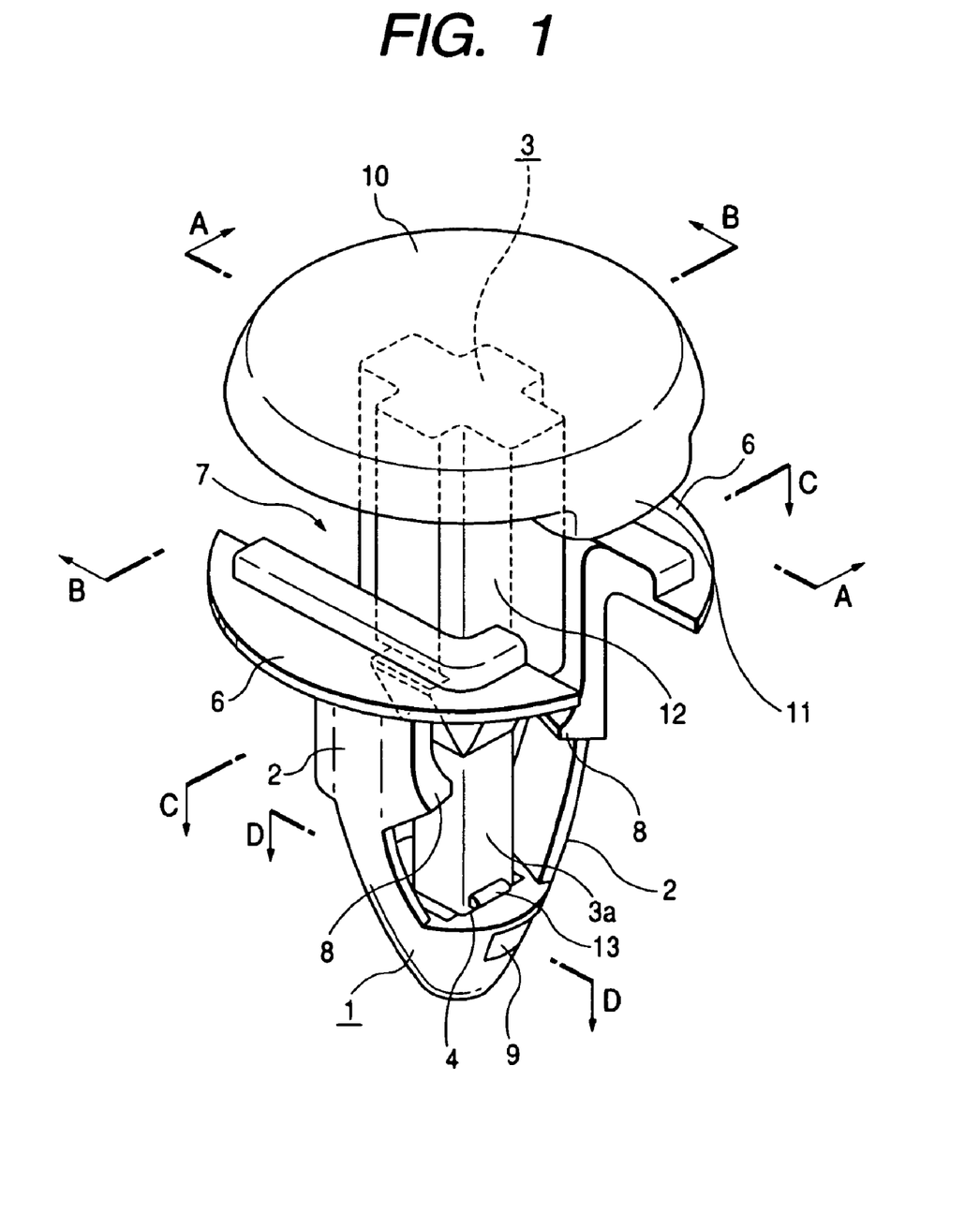
FIG. 1 shows an entire perspective view of a clip according to an embodiment of the invention.
Figure 2:
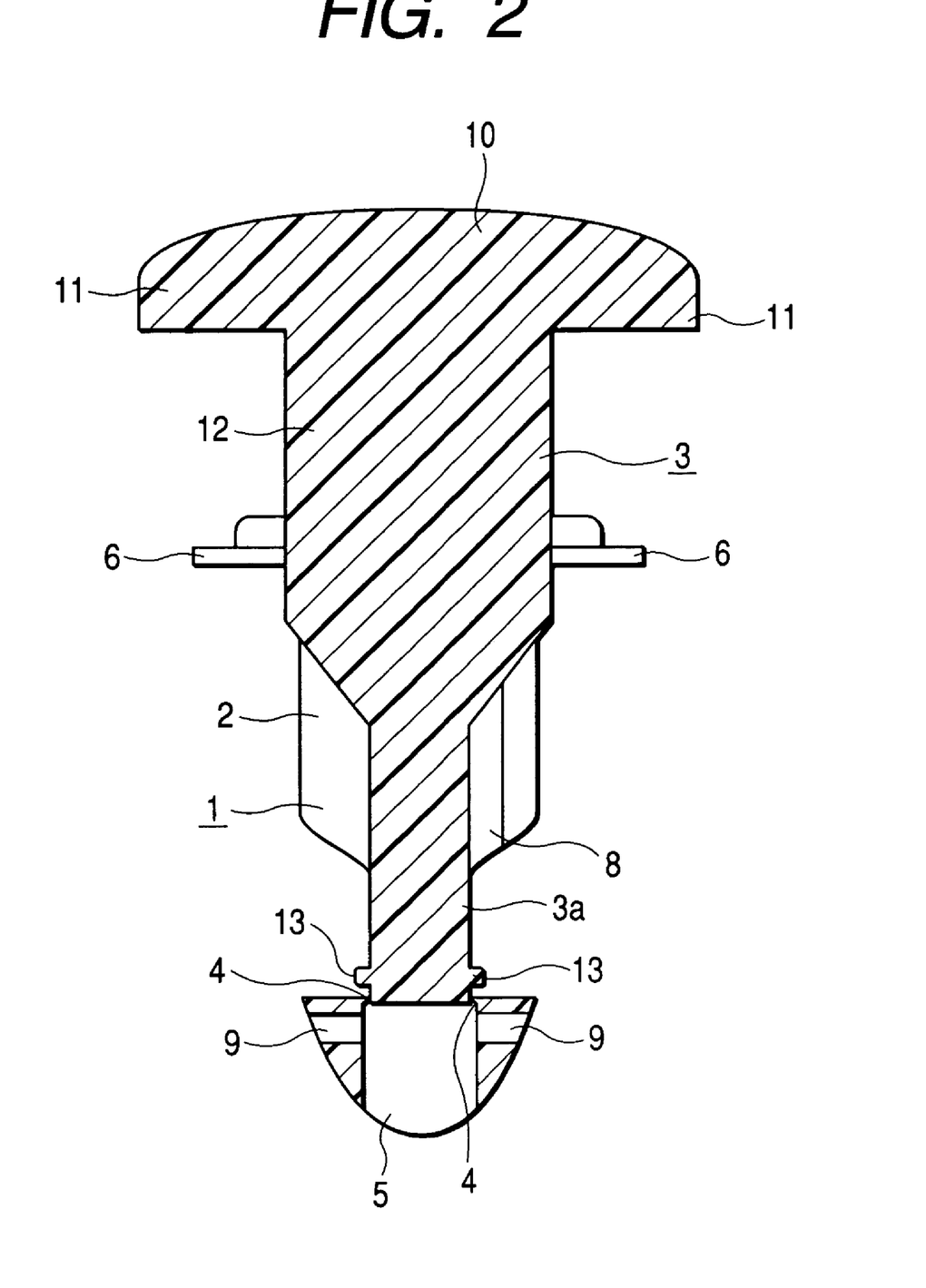
FIG. 2 shows a section view taken along line A—A in FIG. 1.
Figure 3:
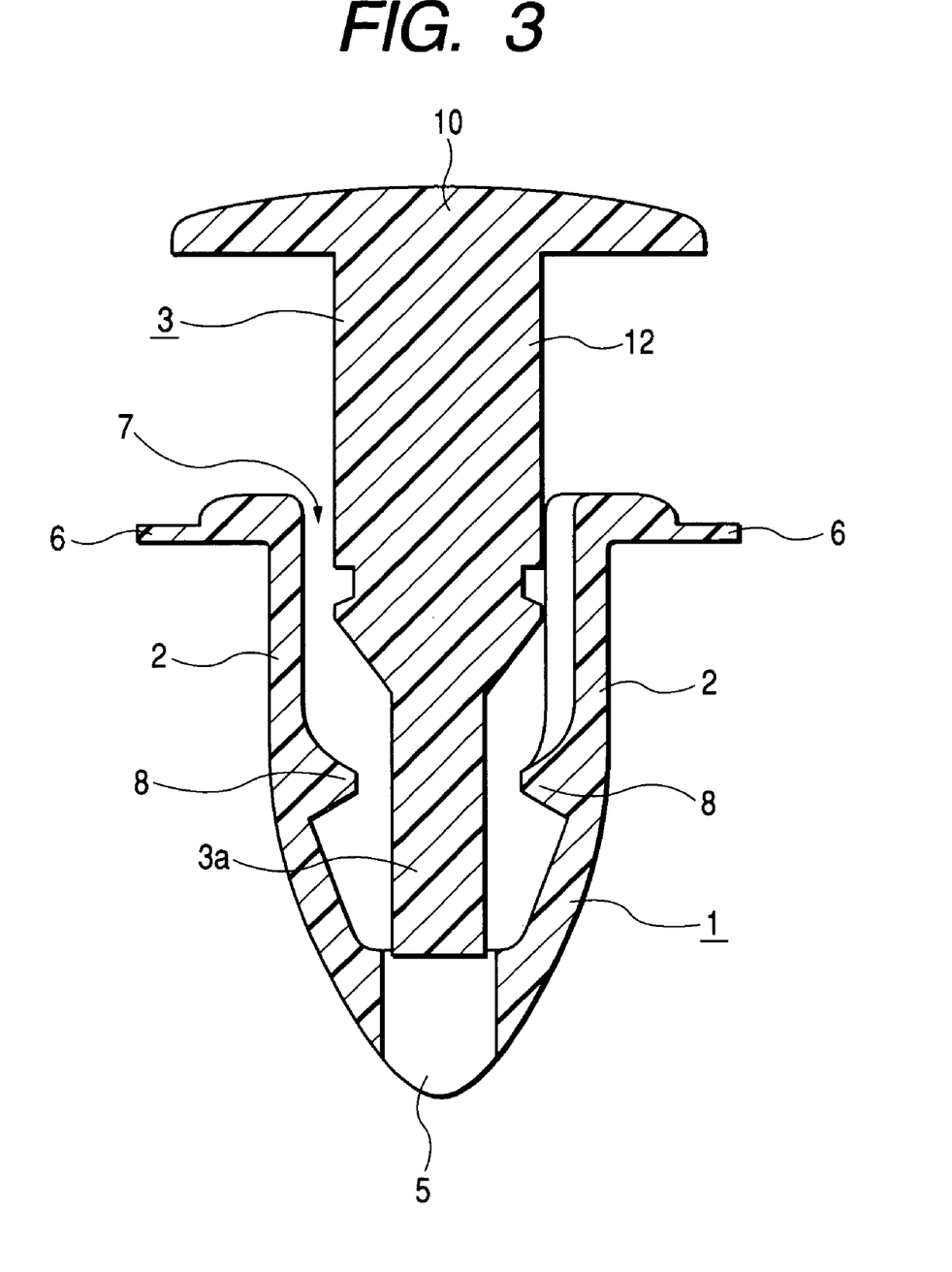
FIG. 3 shows a section view taken along line B—B in FIG. 1.
Figure 4:
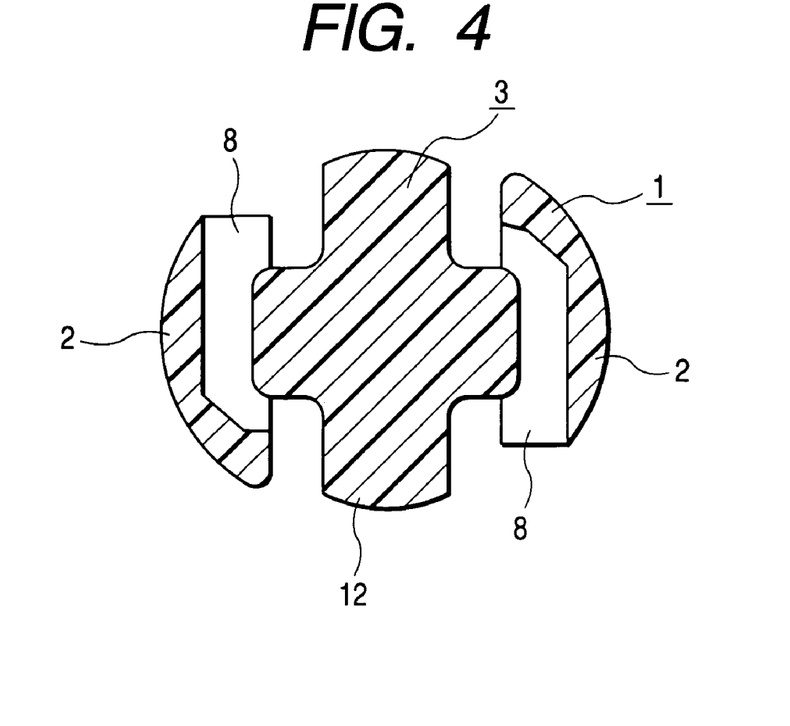
FIG. 4 shows a section view taken along line C—C in FIG. 1.
Figure 5:
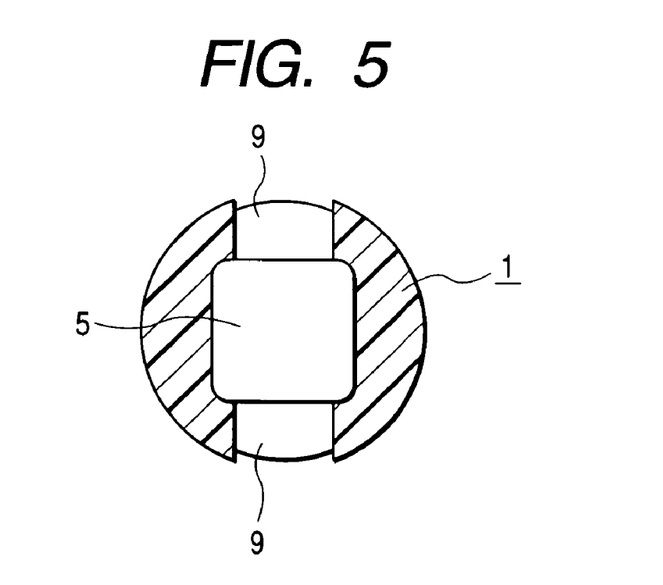
FIG. 5 shows a section view taken along line D—D in FIG. 1.
Figure 6:
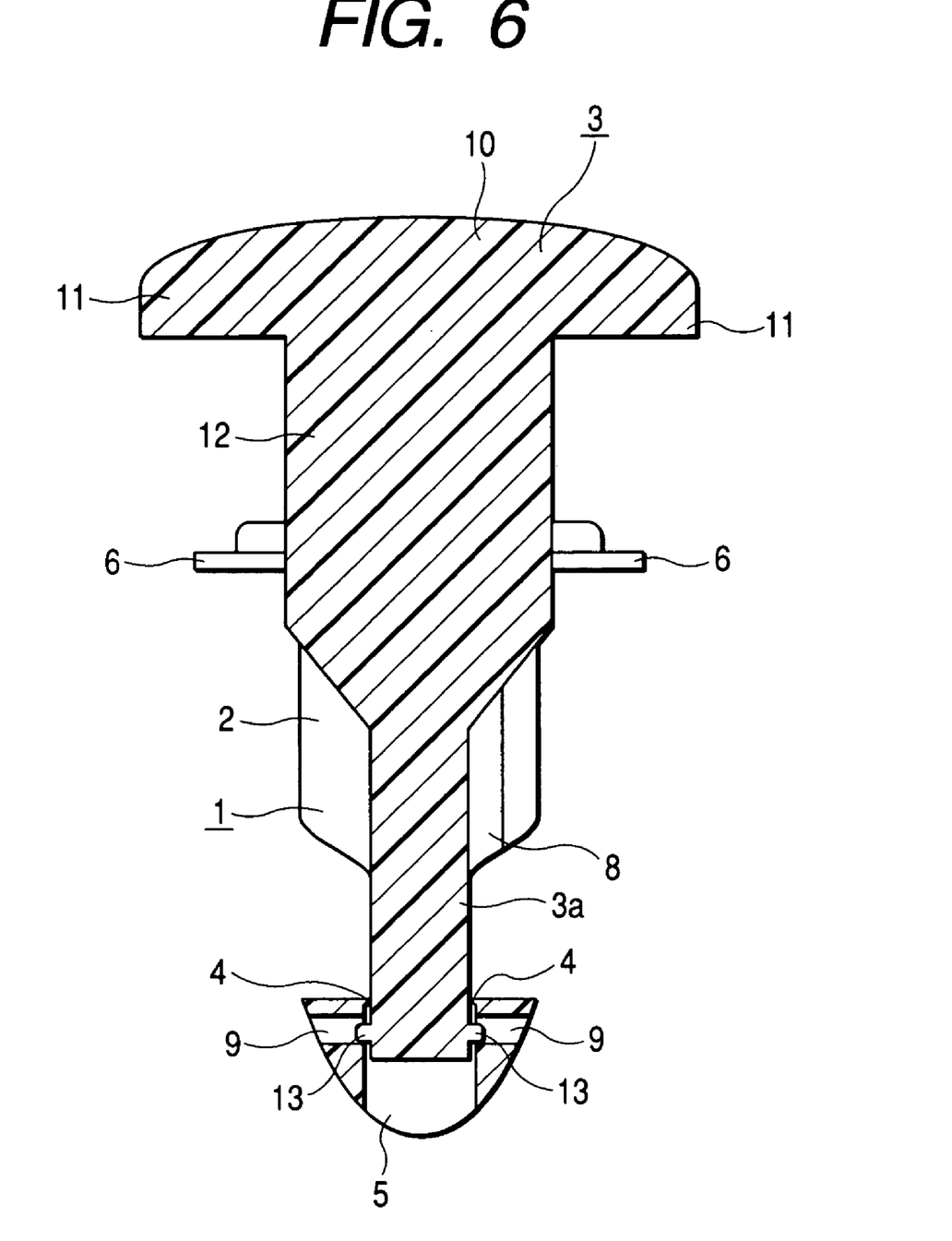
FIG. 6 shows a section view illustrating a state in which a pair of thin connection portions are cut.

Accordingly, in the clip according to the embodiment, since the grommet 1 and the pin 3 are integrally molded through the pair of thin connection portions 4, it is needless to say that the clip can be handled and delivered as it is. Also, in this embodiment, as shown in FIG. 6, the clip is delivered in a such state that the pair of thin connection portions 4 located between the edge of the top portion 3a of the pin 3 and the edge of the through hole 5 are cut in advance by slightly pushing the pin 3 into the inside of the grommet 1 through the circular flange 10. Incidentally, in this case, the convex portions 13 formed at the top portion 3a of the pin 3 engage with the engagement holes 9 formed in the side surfaces of the tip of the V-shape in turn so as to prevent the pin 3 from being disconnected from the grommet 1. Therefore, even if the clip is delivered in such a state that the thin connection portions 4 are cut in advance, there is no fear to cause an adverse effect. In addition, thereby, the pin 3 is kept in a state immediately before use.

Figure 7:
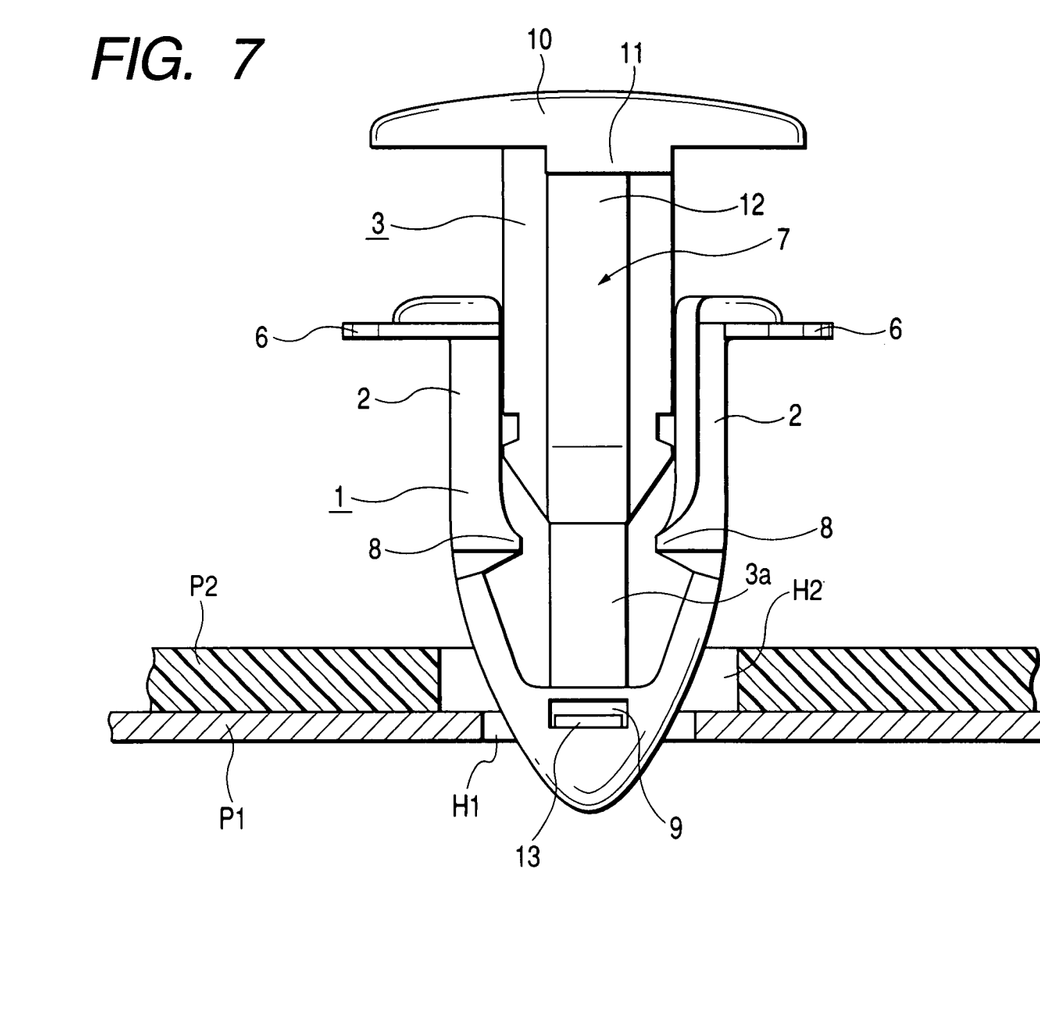
FIG. 7 shows an explanation view illustrating a state immediately before the clip is inserted into each of attachment holes of a trim board and a body panel.
Figure 8:
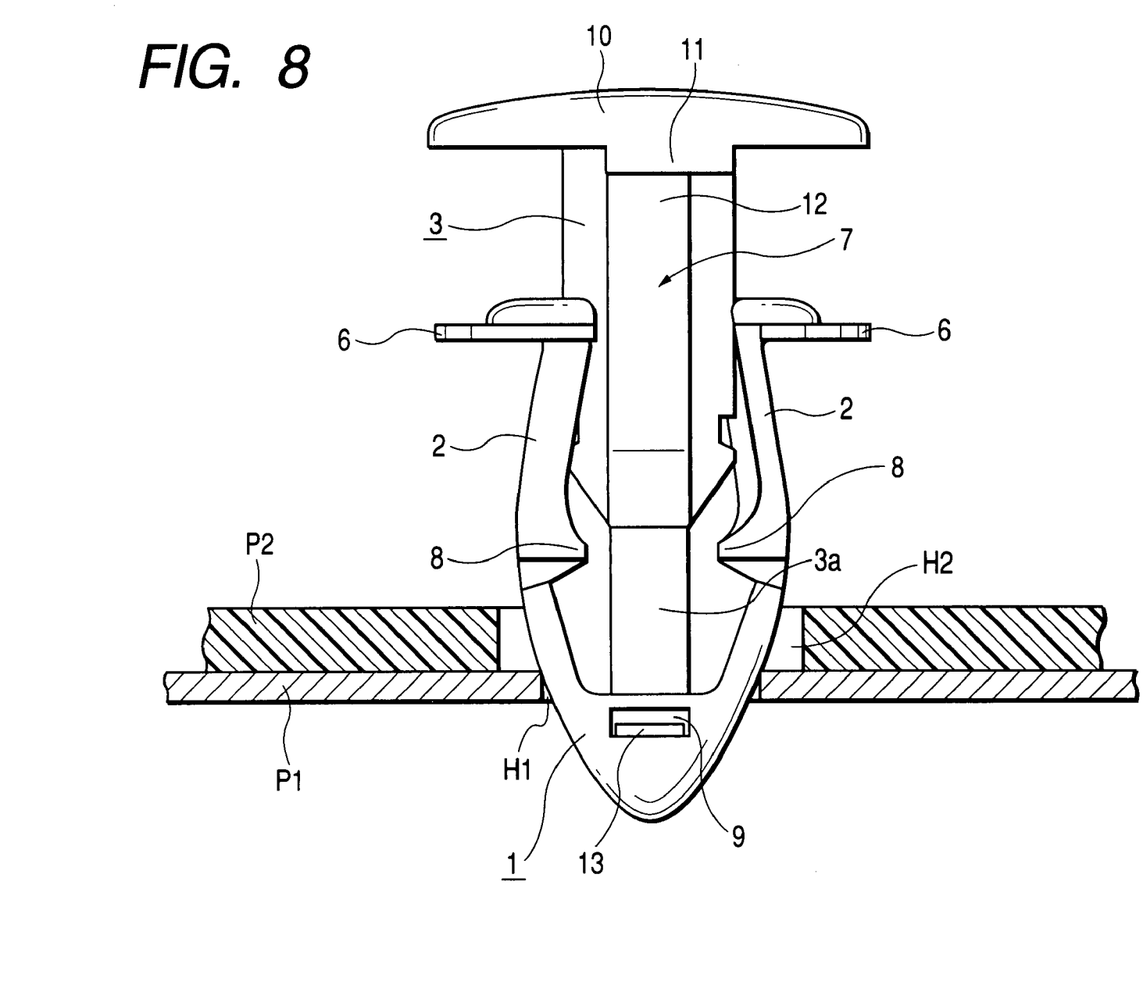
FIG. 8 shows an explanation view illustrating a state in which the clip is slightly inserted into each of attachment holes of the trim board and the body panel.
Figure 9:
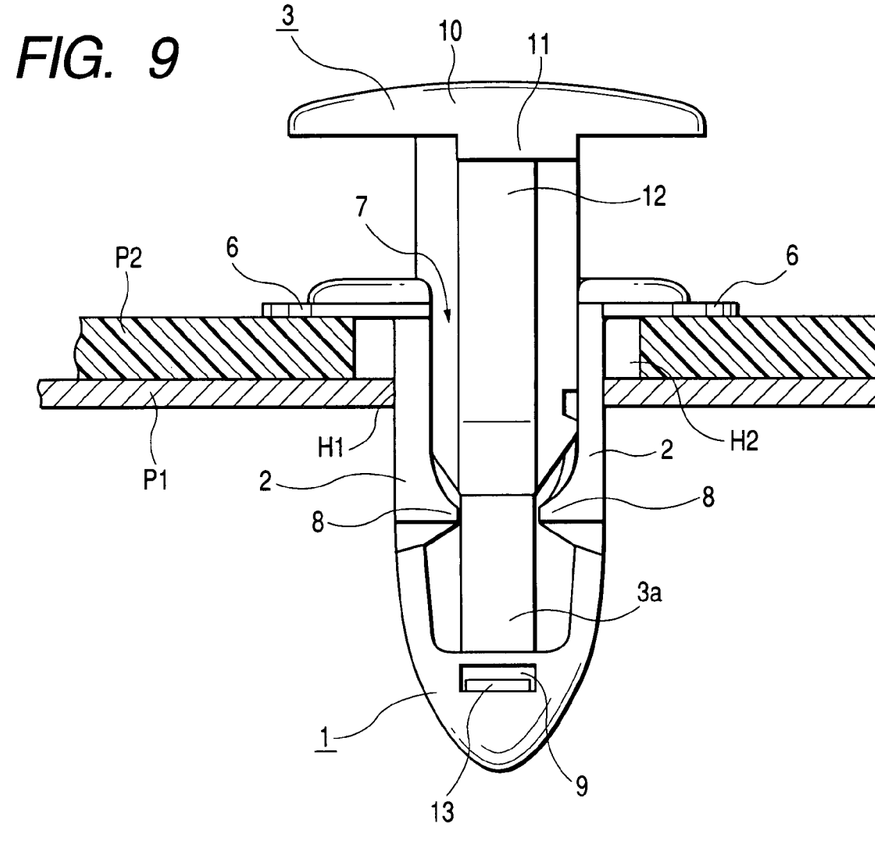
FIG. 9 shows an explanation view illustrating the clip is completely inserted into each of attachment holes of the trim board and the body panel.

It is assumed that a body panel P1 of a vehicle is fixed to a trim board P2 with the delivery state that the thin connection portions 4 are cut. At first, as shown in FIG. 7, positions of attachment holes H1 and H2, which are formed in the body panel P1 and the trim board P2 in advance, respectively, are matched with each other. When each of leg pieces 2 of the grommet 1 is being inserted into the attachment holes H1 and H2, as shown in FIGS. 8 and 9, the pair of leg pieces 2 pass with abutting against an edge of the attachment hole H1 of the body panel P1 so as to be greatly bent inward. The leg pieces 2 of the grommet 1 are inserted until the pair of semicircle flanges 6 abut against a surface of the trim board P2.

Figure 10:
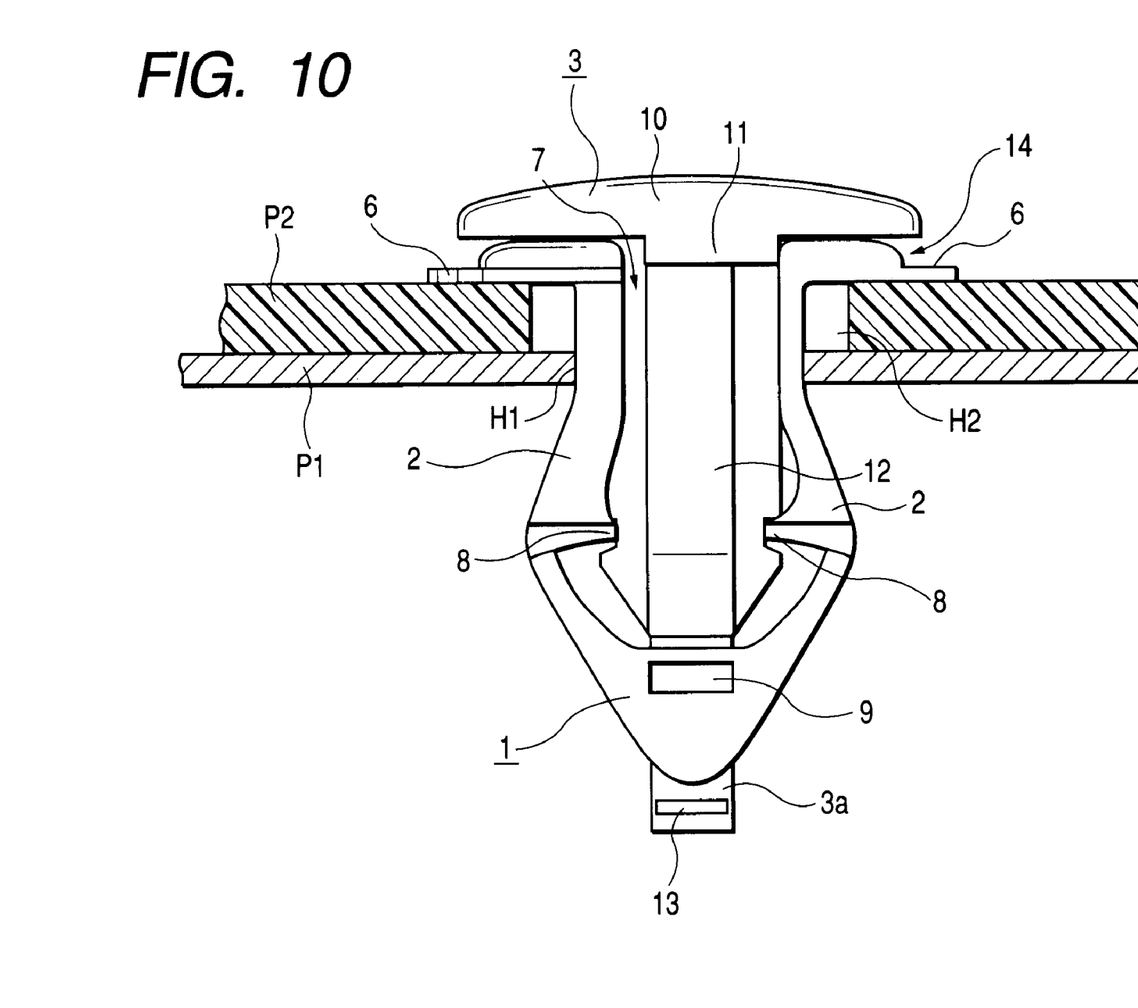
FIG. 10 shows an explanation view illustrating a state in which the trim board is fixed to the body panel by the clip.

Then, when, in turn, the circular flange 10 on the pin 3 side, which protrudes upwardly from the grommet 1, is pushed into, the pin 3 is pushed into the inside of the grommet 1 until the circular flange 10 abuts against the pair of semicircular flanges 6 as shown in FIG. 10. The evagination line 20 of the support portion 12 having the cross shape abuts against the thick portion 8 of each of the leg pieces 2 to forcibly expand the pair of leg pieces 2 outwardly. Thereby, the trim board P2 is surely fixed to the body panel P1 side. In this state, the top portion 3a of the pin 3 having the square shape is come into the through hole 5 having the square shape to prevent rotation of the pin 3 itself. Therefore, the spacer protrusion 11 is accurately fitted into the gap 7 between the semicircle flanges 6 opposed to each other, to fill the gap 7.

Incidentally, in this case, when delivering the clip, the pair of thin connection portions 4 have already been cut. Therefore, an operation for pushing the pin 3 into does not need large force so that it becomes easy to conduct the operation for pushing the pin 3 into the inside of the grommet. If the clip is delivered in a molded piece state, the pair of thin connection portions 4 are cut with resistance at a time of pushing the pin 3 into. In this case, when the thin connection portions 4 are cut, the operation of pushing also can be easily performed thereafter.

When, in order to disconnect the trim board P2 from the body panel P1, a gap 14 between the circular flange 10 and the semicircle flanges 6 is utilized to insert an end portion of a screwdriver into the gap 14 and to forcibly raise the pin 3 upwardly, the evagination line 20 of the support portion 12 is disconnected from the thick portion 8 of each of leg pieces 2. The pin 3 is, then, disconnected from the attachment holes H1 and H2 together with the grommet 1 so that the trim board P2 is easily disconnected from the body panel P1. Incidentally, since the spacer protrusion 11 fills the gap 7 between the pair of semicircle flanges 6, the end portion of the screwdriver cannot be inserted from this position. Accordingly, in any event, in case of the disconnection, there is no fear that the screwdriver or the like scratches a surface of the trim board P2.

Since the invention has the above described structure, differently from the related art, an intermediate portion of the leg pieces of the grommet is not restrained by the thin connection portions but is in a free state. Therefore, when the clip according to the invention is inserted into the attachment hole of the panel, the clip can sufficiently bend inward so that a small pushing-force is required. Also, after the thin connection portions are cut by pushing the pin into the inside of the grommet, similarly the small pushing force is required and the user feels clear resistance when the connection portions are cut.

What is claimed is:

1. A clip comprising:
    a grommet including a pair of expandable leg pieces, the grommet comprising a V-shape;
    a pin, which can relatively move inside the grommet; and
    a thin connection portion integrally connecting the grommet and the pin,
    wherein a through hole for guiding a top portion of the pin is disposed at a tip of the V-shape of the grommet,
    wherein the thin connection portion is located between an edge of the top portion of the pin and an edge of the through hole, and
    wherein the thin connection portion is cut when the pin is pushed into the inside of the grommet,
    wherein the pin comprises a convex portion formed above the thin connection portion,
    wherein an engagement hole for engaging the convex portion is disposed in a side surface of a top portion of the V-shape of the grommet, and
    wherein, when the thin connection portion is cut by pushing the pin into the inside of the grommet, the convex portion engages the engagement hole.

2. The clip according to claim 1, wherein the thin connection portion is disposed at an open side where the leg pieces of the grommet do not exist.

3. The clip according to claim 1, wherein a semicircular flange is formed on a free end of each of the leg pieces of the grommet,
    wherein a circular flange, which corresponds to each of the semicircular flanges, is formed on a base end of the pin, and
    wherein a spacer protrusion is disposed on a rear surface of the circular flange to fill a gap between the semicircular flanges.

4. The clip according to claim 3, wherein the through hole for guiding the top portion of the pin comprises a square shape, and
    wherein the top portion of the pin comprises a square shape substantially corresponding to the through hole.

5. The clip according to claim 1, wherein the thin connection portion is disposed at an open side of the grommet, said open side being a side interposing the pair of expandable leg pieces.

6. The clip according to claim 1, wherein the thin connection portion comprises a plurality of thin connection portions disposed at open sides of the grommet, and wherein said open sides are sides that interpose the pair of expandable leg pieces.

7. The clip according to claim 1, wherein each of the pair of expandable leg pieces comprises:
    a fixed end integrally formed with a proximal end of the grommet, said proximal end of said grommet comprising an end of said grommet wherein said pair of expandable leg pieces are attached at said proximal end of said grommet; and
    a free end.

8. The clip according to claim 1, wherein each of the pair of expandable leg pieces comprises an unrestrained intermediate portion.

9. A clip comprising:
    a grommet including a proximal end and a distal end;
    a pin including a proximal end and a distal end; and
    a thin connection portion integrally connecting the grommet and the pin,
    wherein the grommet comprises:
        a pair of expandable leg pieces extending from said proximal end of the grommet, wherein said pair of expandable leg pieces are attached at said proximal end of said grommet, and
        a through hole for guiding a top portion of the pin formed in the proximal end of the grommet,
    wherein the pin is movable inside the grommet and relative to the grommet,
    wherein the thin connection portion is located between an edge of the proximal end of the pin and an edge of the through hole;
    wherein the thin connection portion comprises a frangible connection portion that is cut when the pin moves inside of the grommet,
    wherein the pin comprises a convex portion disposed on the pin at a distal end side of the pin with respect to the thin connection portion,
    wherein an engagement hole for engaging the convex portion is disposed in a side surface of the proximal end of the grommet, and
    wherein, when the pin moves toward said proximal end of the grommet, the convex portion engages the engagement hole.

10. The clip according to claim 9, wherein the thin connection portion is disposed at an open side of the grommet, said open side being a side interposed between the pair of expandable leg pieces.

11. The clip according to claim 9, wherein a free end of each of the leg pieces of the grommet comprises a semicircular flange;
    wherein said distal end of the pin comprises a circular flange which corresponds to each semicircular flange of the leg pieces, and
    wherein the circular flange comprises a spacer protrusion included on a rear surface of the circular flange that fills a gap between the semicircular flanges of the leg pieces.

12. The clip according to claim 11, wherein, in a state of complete engagement of the pin inside the grommet, the circular flange of the pin abuts each semicircular flange of the leg pieces.

13. The clip according to claim 9, wherein the through hole comprises a shape that substantially corresponds to a shape of the proximal end of the pin.

14. The clip according to claim 9, wherein the through hole comprises a square shape, and wherein the proximal end of the pin comprises a square shape substantially corresponding to the square shape of the through hole.

15. The clip according to claim 9, wherein the pin comprises a first locking portion disposed on the pin at a distal end side of the pin with respect to the thin connection portion, wherein a second locking portion is disposed in a side surface of the proximal end of the grommet, and wherein, when the pin moves toward a proximal end of the grommet, the first locking portion engages the second locking portion, thereby preventing the pin from being disconnected from the grommet after the thin connection portion is cut.

16. The clip according to claim 15, wherein the first locking portion disengages the second locking portion when the pin relatively moves toward a state of complete engagement of the pin inside the grommet.

17. The clip according to claim 9, wherein said distal end of the pin comprises a cross-shaped cross-section.

18. The clip according to claim 9, wherein, when the pin portion translates relative to the grommet toward the proximal end of the grommet, the pin portion cooperates with each of the pair of expandable leg pieces to expand each of the expandable leg pieces outwardly from a longitudinal axis of the grommet.

* * * * *